US012578790B2

(12) United States Patent
Feng

(10) Patent No.: US 12,578,790 B2
(45) Date of Patent: Mar. 17, 2026

(54) METHOD FOR CALIBRATING OF EYE TRACKING, WEARABLE DEVICE AND STORAGE MEDIUM

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yu-Zhong Feng, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/813,456

(22) Filed: Aug. 23, 2024

(65) Prior Publication Data

US 2025/0390170 A1 Dec. 25, 2025

(30) Foreign Application Priority Data

Jun. 25, 2024 (CN) .......................... 202410836313.4

(51) Int. Cl.
*G06F 3/01* (2006.01)
*G06T 7/73* (2017.01)

(52) U.S. Cl.
CPC ................ *G06F 3/013* (2013.01); *G06T 7/73* (2017.01); *G06T 2207/30201* (2013.01)

(58) Field of Classification Search
CPC ... G06T 7/73; G06T 7/20; G06T 2207/30204; G06F 3/013
See application file for complete search history.

(56) References Cited

FOREIGN PATENT DOCUMENTS

KR 102315674 B1 * 10/2019 ............. A61H 5/005
TW 202301872 A * 1/2023 ............. G06F 3/013

* cited by examiner

*Primary Examiner* — Matthew A Eason
*Assistant Examiner* — Scott D Au
(74) *Attorney, Agent, or Firm* — ScienBiziP, P.C.

(57) ABSTRACT

A method for calibrating of eye tracking is provided by present application. The method includes directing a user to focus sight line on a preset marker of a display screen in response to a calibration instruction, and controlling the preset marker to move along a preset moving trajectory and obtaining eye movement data of the user and data of the preset marker in response that the sight line of the user is detected to be focused on the preset marker, and performing eye tracking calibration based on a corresponding relationship between the eye movement data and the data of the preset marker.

17 Claims, 5 Drawing Sheets

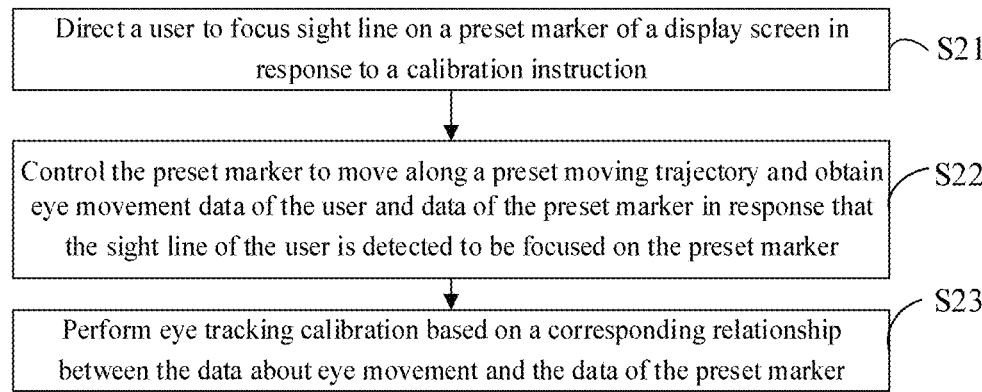

| Direct a user to focus sight line on a preset marker of a display screen in response to a calibration instruction | ⌐ S21 |

| Control the preset marker to move along a preset moving trajectory and obtain eye movement data of the user and data of the preset marker in response that the sight line of the user is detected to be focused on the preset marker | ⌐ S22 |

| Perform eye tracking calibration based on a corresponding relationship between the data about eye movement and the data of the preset marker | ⌐ S23 |

FIG. 3

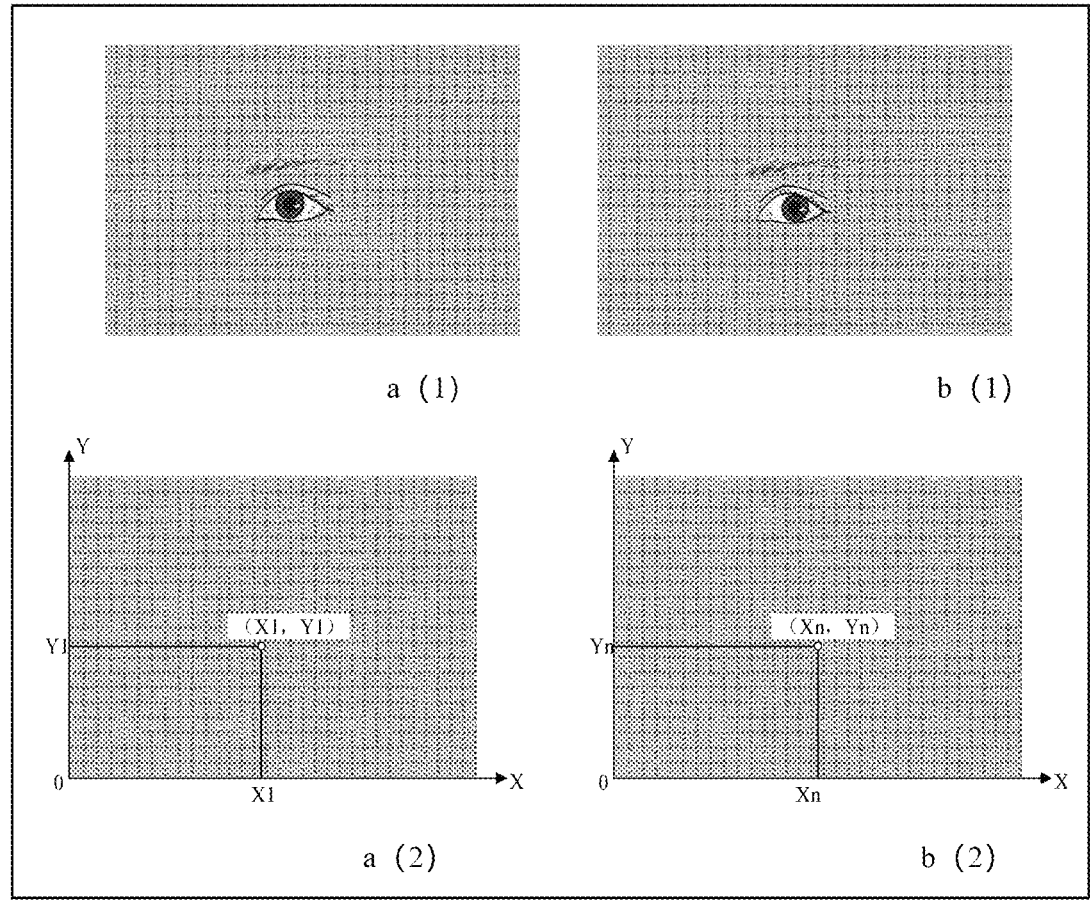

METHOD FOR CALIBRATING OF EYE TRACKING, WEARABLE DEVICE AND STORAGE MEDIUM

FIELD

The subject matter herein generally relates to a field of virtual reality and augmented reality, and in particular to a method for calibrating of eye tracking and a wearable device and a storage medium.

BACKGROUND

A principle of eye tracking technology is to determine a position of an eye focus through a corresponding software algorithm and a sensor that tracks eye movement, and then locate a position of the eye focus projected on a display screen. The eye tracking technology provides a natural way to interact with a virtual reality (VR) device and an augmented reality (AR) device, allowing a user to interact with virtual world without touching a screen or other physical controls.

When tracking the eye movement through the eye tracking technology, it is necessary to analyze eye movement data collected by the sensor, calculate the position of the eye focus through the software algorithm, and project the position of the eye focus to the display screen. Among them, a relative position of the sensor and the eye, a relative position of the sensor and the display screen, and a relative position between multiple sensors, etc., all have an important impact on accuracy of tracking the eye movement. If a pair of smart glasses (such as VR glasses or AR glasses) are worn in a skewed way or worn out due to long-term use, collision, or other factors, the original assembly positions, such as the relative position of the sensor and the eye, the relative position of the sensor, and the display screen, may change. Thus, deviations from the eye movement data collected by the sensor are generated, the calculation result of the software algorithm is affected, and the accuracy of eye tracking is reduced.

BRIEF DESCRIPTION OF THE DRAWINGS

In order to more clearly illustrate a technical solution of an embodiment of the present application, drawings required in description of the embodiment of the present application will be briefly introduced below. Obviously, the drawings described below are only some embodiments of the present application. For those skilled in the art, other drawings can be obtained based on these drawings without paying any creative labor.

FIG. 3 is a flowchart of an embodiment of a method for calibrating of eye tracking provided in an embodiment of the present application.

FIG. 4 is an example diagram of an image of an orientation of an eyeball provided in an embodiment of the present application.

DETAILED DESCRIPTION

Figure 1:
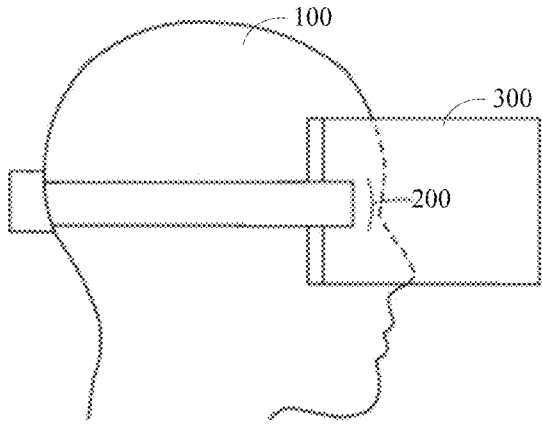
FIG. 1 is a schematic diagram of wearing a wearable device provided in an embodiment of the present application.

The following will describe the technical solutions in embodiments of the present application clearly and completely in conjunction with the accompanying drawings in the embodiments of the present application. Obviously, the described embodiments are part of the embodiments of the present application, not all of the embodiments. Based on the embodiments in the present application, all other embodiments obtained by ordinary technicians in the field without creative work are within the scope of protection of the present application.

The terms "first" and "second" are used for descriptive purposes only and should not be understood as indicating or implying relative importance or implicitly indicating the number of indicated technical features in the following description. Thus, features defined as "first" and "second" may explicitly or implicitly include one or more of the features. In description of the embodiments of the present application, words such as "exemplary" or "for example" are used to indicate examples, illustrations or explanations. Any embodiment or design described as "exemplary" or "for example" in the embodiments of the present application should not be interpreted as being more preferred or more advantageous than other embodiments or designs. Specifically, the use of words such as "exemplary" or "for example" is intended to present related concepts in a concrete way.

Unless otherwise defined, all technical and scientific terms used herein have the same meaning as those generally understood by technicians in the technical field in the present application. The terms used in the specification of the present application are only for the purpose of describing specific embodiments and are not intended to limit the present application. It should be understood that, unless otherwise specified in the present application, "/" means or. For example, A/B represents A or B. "And/or" in the present application is only a description of an association relationship of associated objects, indicating that three relationships exist. For example, A and/or B can represent: A exists alone, A and B exist at the same time, and B exists alone. "At least one" means one or more. "Multiple" means two or more than two. For example, at least one of a, b or c represents seven situations. That is, a, b, c, a and b, a and c, b and c, a, b and c.

The implementation of eye tracking technology usually relies on support of software and hardware. In terms of hardware, a sensor is required to capture movements of an eyeball of the eye, and the sensor needs to be installed in an appropriate position to ensure that the movement of the eyeball is accurately tracked. For example, the relative position of the sensor and the eyeball, the relative position of the sensor and the display screen, and the relative position of multiple sensors, etc., all need to be precisely controlled. On the other hand, the eye movement data captured by the sensor needs to be analyzed by the software algorithm to calculate the position of the eye focus and the position of the eye focus is projected onto the display screen. This process requires complex image processing and data analysis technologies to ensure the accuracy and reliability of the results.

However, as a wearable device (such as VR glasses or AR glasses) is worn in a skewed way or is worn out due to long-term use, collision, or other factors, the original assembly positions, such as the relative position of the sensor and the eye, the relative position of the sensor, and the display screen, may change. This change will seriously affect the accuracy of eye tracking, because even a slight change in position may cause deviations in the eye movement data captured by the sensor, which in turn affects the calculation results of the software algorithm. If the accuracy of eye tracking is reduced, the user's interactive experience will also be greatly affected. For example, in a virtual reality (VR) game, if eye tracking cannot accurately track the user's eye movements, the user may not be able to accurately aim at a target or perform other operations, which will reduce gaming experience of the user.

In related arts, the user may recalibrate the wearable device by returning the wearable device to the factory, which is cumbersome, long and has low calibration efficiency.

To solve the above problem, the present application responds to a calibration instruction, displays a preset marker, which is moving according to a preset movement trajectory on the display screen, and directs the user to focus a line of sight on the preset marker on the display screen. By obtaining a correspondence relationship between the eye movement data of the user and data of the preset marker, the automatic calibration of the eye tracking is realized, and there is no need to return the wearable device to the factory for recalibration, which can effectively improve the calibration efficiency.

Taking the wearable device such as the pair of the smart glasses (such as the VR glasses or the AR glasses) as an example, as shown in FIG. 1, when a head 100 of the user wears a wearable device 300, the wearable device 300 fits eyes of the user, so that an eyeball 200 of the user is naturally aligned with the wearable device 300, ensuring that the user clearly sees images of a virtual environment.

Figure 2:
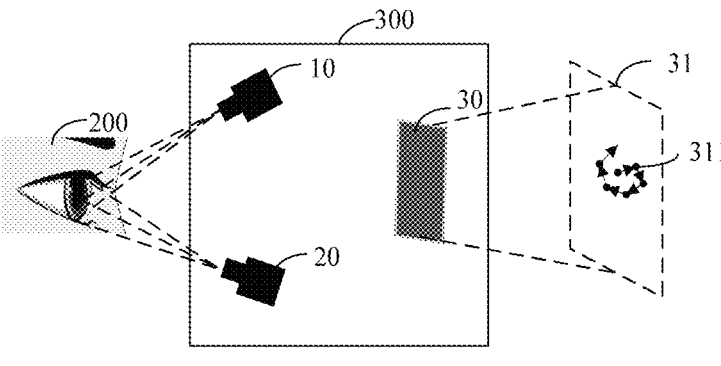
FIG. 2 is a schematic diagram of a realization principle of a method for calibrating of eye tracking provided in an embodiment of the present application.

Please refer to FIG. 2, which is an example diagram of the implementation principle of the eye movement calibration method provided in an embodiment of the present application. As shown in FIG. 2, the wearable device 300 includes a sensor 10, a sensor 20, and a display screen 30. The sensor 10 and the sensor 20 are disposed at different positions inside the wearable device 300. A display image 31 of the display screen 30 displays a preset marker 311, and the preset marker 311 moves according to a preset moving trajectory. The preset marker 311 is used to direct the user to track a fixed position.

In the process of implementing eye tracking calibration, the wearable device 300 displays the preset marker 311 on the display screen 30 and directs the user to focus the line of sight on the preset marker 311 on the display image 31. The wearable device 300 controls the preset marker 311 to move along the preset moving trajectory, and during the user tracking the preset marker 311 by eyes, the wearable device 300 obtains data of the preset marker 311 and obtains the eye movement data of the user by tracking the movement of the eyeball 200 through the sensor 10 and the sensor 20, and establishes a corresponding relationship between data of the preset marker 311 and the eye movement data. The wearable device 300 performs eye tracking calibration based on the correspondence relationship between data of the preset marker 311 and the eye movement data to improve the accuracy of eye tracking.

In some embodiments, after the wearable device 300 obtains the corresponding relationship between data of the preset marker and the eye movement data, the wearable device 300 stores the corresponding relationship in a preset memory and deletes an original corresponding relationship stored in the preset memory.

In some embodiments, the wearable device 300 achieves human-computer interaction based on the corresponding relationship between data of the preset marker and the eye movement data.

In some embodiments, the wearable device 300 may be any one of smart glasses, such as VR glasses, AR glasses, sports and health tracking glasses, or other types of smart glasses. The embodiment of the present application does not limit the type of the wearable device 300. The sensor 10 and the sensor 20 may be any one or more of infrared cameras, an infrared sensing sensor, etc. The display screen 30 may be any one of a micron light emitting diode display screen (micro-LED), an organic light emitting diode display screen (OLED), a liquid crystal display screen, etc.

In some embodiments, a working mode of the sensor 10 and the sensor 20 may be the sensor 10 working or the sensor 20 working independently, or the sensor 10 and the sensor 20 may work together to capture the eye movement data of the user.

The scenario shown in FIG. 2 is only a schematic example, and method for calibrating of eye tracking provided by the present application may also be applied in other scenarios. For example, in some scenarios, sensors at other different positions may also be set in the wearable device 300, and multiple sensors may work independently or in cooperation with each other. In some scenarios, the wearable device 300 may also include a group of lenses for adjusting the light emitted by the display screen. In some scenarios, the wearable device 300 may also include a processor, a storage device, etc. In some scenarios, the wearable device 300 may also include other types of hardware components. In summary, the embodiment of the present application does not limit the specific application scenarios of the method for calibrating of eye tracking.

Please refer to FIG. 3, which is a flowchart of the implementation of the eye tracking calibration method provided by the embodiment of the present application. The method is applied to a wearable device, and the embodiment of the present application takes the application of the method to the wearable device 300 in FIG. 1 as an example for explanation.

The method includes the following steps.

S21: the wearable device directs the user to focus sight line on the preset marker of the display screen in response to a calibration instruction.

In some embodiments, the display screen displays at least one preset marker. A shape of the preset marker may be customized, for example, the preset marker may be a dot, a triangle, a crosshair, etc. The embodiment of the present application does not limit the shape of the preset marker. The preset marker needs to have a clear visual feature so that the user may easily focus the sight line on the preset marker.

In some embodiments, a way to trigger the calibration instruction may be customized. For example, a mechanical button may be set in the wearable device, or a button may be displayed on a display interface of the display screen to trigger the calibration instruction. For another example, the wearable device may pre-set a trigger condition, and automatically trigger the calibration instruction when the trigger condition is met. Among them, the trigger condition may be customized. For example, the trigger condition may be set to no response to a user operation, etc. The embodiment of the present application does not limit the way to trigger the calibration instruction and the specific setting of the trigger condition.

In some embodiments of the present application, the wearable device directs the user to focus sight line on the preset marker in a preset manner. Among them, the preset manner includes at least one or more of text prompt information, voice prompt information, a flashing preset marker, etc. The embodiment of the present application does not limit the preset manner.

In some embodiments, the text prompt information and the voice prompt information may be customized. For example, the content of the voice prompt information may be set to "please adjust the sight line to align with the preset marker". The specific content of the text prompt information and the voice prompt information is not limited in the embodiment of the present application.

In other embodiments, in order to ensure the accuracy of eye tracking calibration, the user may need to keep looking at the preset marker for a time period of time, rather than quickly scanning the preset marker. Therefore, the wearable device may also direct the user to focus on the preset marker on the display screen for a period of time. Among them, the prompts include but is not limited to a text prompt, a voice prompt, etc. The embodiment of the present application does not limit the prompts.

In other embodiments, considering a visual ability and device conditions of different users, in order to ensure that the calibration process may proceed smoothly in various environments, the wearable device provides different prompts for different users and device conditions. For example, for users with poor eyesight, an enlarged gaze point or voice prompt may be provided. For users using specific wearable devices (such as a VR helmet, which usually has higher resolution, wider field of view, lower latency, etc.), the wearable device may adjust the interface features of the display screen to adapt to the display characteristics.

S22: the wearable device controls the preset marker to move along the preset moving trajectory and obtains the eye movement data of the user and the data of the preset marker in response that the sight line of the user is detected to be focused on the preset marker.

In some embodiments, in order to improve the accuracy of calibration, the preset moving trajectory needs to fully cover a field of view of the user. As the preset marker moves along the preset moving trajectory, the eyeball of the user tracks the preset marker and then moves along the preset moving trajectory.

Taking the wearable device setting a preset marker as an example, the wearable device directs the user to look at the preset marker by flashing of the preset marker. In the process of controlling the preset marker to move along the preset moving trajectory, the wearable device sets a duration threshold when the user is looking at the preset marker. The duration threshold may be set based on the user's physiological characteristics (such as eyeball reaction time) and the technical specifications of the wearable device. When it is determined that the duration of the user looking at the preset marker is greater than or equal to the duration threshold, the wearable device determines that the sight line of the user is stably focused on the preset marker and obtains the eye movement data of the user and the data of the preset marker.

In other embodiments, the wearable device also determines whether the sight line of the user is stably focused on the preset marker by detecting a stability of the eye movement of the user. For example, if the eyeball of the user remains stable for a period of time (such as tens of milliseconds) without significant movement, then the wearable device determines that the user has steadily gazed at the preset marker and obtains the eye movement data of the user and the data of the preset marker.

In other embodiments, the wearable device also provides a clear prompt and feedback to guide the user to correctly focus on the preset marker. For example, the wearable device displays an animation on the display screen or generates a sound prompt to remind the user of the preset marker that needs to be focused on. The embodiments of the present application do not limit the method of determining that the user is stably focused on the preset marker.

In other embodiments, a plurality of preset markers may be displayed on the display screen, and the user may be directed to sequentially gaze at the preset markers by numbers, arrows or other means. When the user sequentially gazes at the preset markers, the wearable device may obtain the eye movement data of the user and the data of the preset markers.

In some embodiments of the present application, the eye movement data includes location data of the eyeball of the user. The wearable device obtains the eye movement data including obtaining an image of the eyeball when a location of the eyeball is corresponding to the location data; determining a relative position of the eyeball of the user in the image using a feature extraction algorithm and calculating a coordinate of the eyeball according to the relative position; and determining the location data of the eyeball according to the coordinate.

In some embodiments, the location data of the eyeball includes the coordinate. The feature extraction algorithm includes, but is not limited to, one or more algorithms such as a Scale-Invariant Feature Transform (SIFT) algorithm, an oriented FAST and rotated BRIEF (ORB) algorithm, and the like. The present application embodiment does not limit the feature extraction algorithm.

In some embodiments, the wearable device obtains the image of the orientation of the eyeball of the user through the sensor. One or more sensors are set in the wearable device. Each sensor obtains the image of the orientation of the eyeball of the user independently, and multiple sensors obtain multiple images of the orientation of the eyeball of the user together. For the image of the orientation of the eyeball obtained from each sensor, the wearable device determines the relative position of the eyeball of the user in the image by using a feature extraction algorithm and calculates the coordinate of the eyeball according to the relative position; and sets the coordinate of the eyeball as the location data of the eyeball.

In some embodiments, the wearable device establishes a coordinate system with a center of the image of the orientation of the eyeball as an origin or establishes a coordinate system with any position of the image of the orientation of the eyeball as an origin. In the embodiment of the present application, the method of establishing the coordinate system is not limited.

In some embodiments, the wearable device obtains the image of the orientation of the eyeball by using a sensor. As shown in FIG. 4, a(1) in FIG. 4 shows the image of the orientation of the eyeball which is obtained by the wearable device using the sensor. And a(2) in FIG. 4 shows the coordinate (X1, Y1) of the eyeball of the a(1) in FIG. 4 which is determined by the wearable device using the feature extraction algorithm. When the eyeball in a(1) in FIG. 4 moves to another position, the wearable device obtains the image of the orientation of the eyeball by using the sensor again, and determines the coordinate of the eyeball by using the feature extraction algorithm. b(1) in FIG. 4 shows the image of the orientation of the eyeball obtained by the sensor after the eyeball moves to another position, and b(2) in FIG. 4 shows the coordinate (Xn, Yn) of the eyeball of the b(1) in FIG. 4 which is determined by the wearable device using the feature extraction algorithm.

Figure 5:
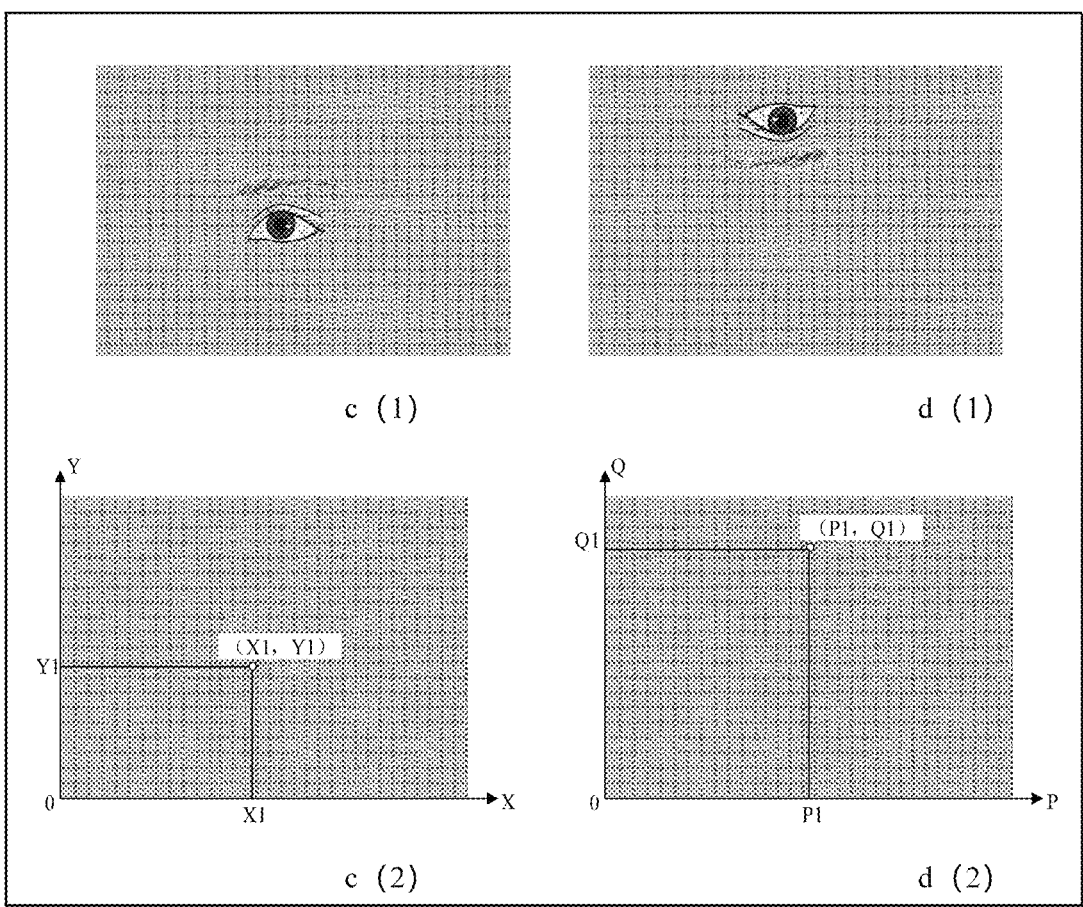
FIG. 5 is an example diagram of an image of an orientation of an eyeball provided in another embodiment of the present application.

In some embodiments, the wearable device obtains multiple images of the orientation of the eyeball of the user at different positions. As shown in FIG. 5, c(1) in FIG. 5 and d(1) in FIG. 5 are two images of the orientation of the eyeball obtained by the wearable device using sensors at different positions. c(2) in FIG. 5 shows the coordinate (X1, Y1) of the eyeball of the c(1) in FIG. 5 determined by the wearable device through the feature extraction algorithm, and d(2) in FIG. 5 shows the coordinate (P1, Q1) of the eyeball of the d(1) in FIG. 5 determined by the wearable device through the feature extraction algorithm. By implementing eye tracking calibration based on eye movement data of multiple images of the orientation of the eyeball, the accuracy of eye tracking calibration can be improved.

In some embodiments of the present application, the data of the preset marker includes position data of the preset marker. The wearable device obtains the data of the preset marker includes: establishing a regional coordinate system according to a display area of the preset marker on the display screen; obtaining the relative position of the preset marker on the display area, and determining coordinates of the preset marker according to the relative position of the preset marker on the display area and the regional coordinate system; and determining the position data of the marker according to the coordinates.

In some embodiments, the wearable device takes any position of the display interface in the display screen as the origin to establish the regional coordinate system. For example, the center of the display interface may be selected as the origin to establish the regional coordinate system. The embodiments of the present application do not limit the method of establishing the regional coordinate system.

In some embodiments, the wearable device selects any position from the display interface of the display screen as the initial position of the preset marker and controls the preset marker to move along the preset moving trajectory. The wearable device determines the coordinates of the preset marker by obtaining the relative position of the preset marker on the display area, determines the coordinates of the preset marker according to the relative position of the preset marker on the display area and the regional coordinate system, and determines the position data of the marker according to the coordinates of the preset marker.

Figure 6:
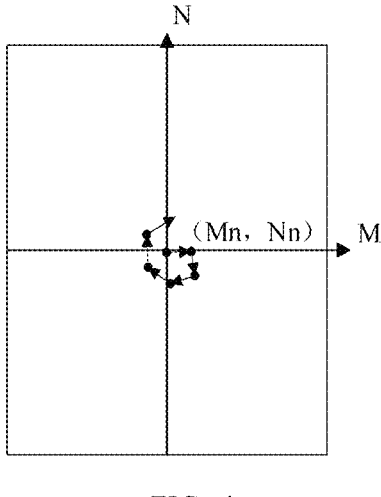
FIG. 6 is an example diagram of a preset movement trajectory provided in an embodiment of the present application.

As an example, as shown in FIG. 6, the wearable device takes any position of the display interface of the display screen as an origin to establish an M-N coordinate system. In the M-N coordinate system, the coordinates of the preset marker may be expressed as (Mn, Nn), where the value of n can be customized. For example, n may be an integer greater than or equal to 1.

In some embodiments of the present application, the wearable device determines a period of time the preset marker staying at any position in response that the preset marker moves along the preset moving trajectory based on reaction time of the eyeball of the user.

In some embodiments, the wearable device determines a period of time the preset marker staying at any position in response that the preset marker moves along the preset moving trajectory based on reaction time of the eyeball of the user, thereby ensuring that the wearable device has sufficient time to capture the eye movement data of the user, thereby improving the accuracy of calibration.

In some embodiments of the present application, the wearable device determines a spatial distance between any two adjacent positions when the preset marker moves along the preset moving trajectory based on an interface resolution of the display screen.

In some embodiments, display screens with different resolutions have different pixel densities and visible area sizes. If the spatial distance between any two adjacent positions when the preset marker moves along the preset moving trajectory is not adjusted according to the interface resolution. Then on a high-resolution display screen, the spatial distance between any two adjacent positions of the preset marker may be too close, making it difficult for the wearable device to distinguish between the preset markers at different positions. And on a low-resolution display screen, the spatial distance between any two adjacent positions of the preset marker may be too dispersed, thereby increasing the difficulty of calibration.

The wearable device determines the spatial distance between any two adjacent positions when the preset marker moves along the preset moving trajectory according to the interface resolution of the display screen, so as to ensure that the preset marker has similar visual size and spacing relative to the visible area of the entire display screen on display screens with different resolutions, which helps users to obtain a consistent calibration experience on different wearable devices.

In other embodiments, when the preset marker moves along the preset moving trajectory, the spatial distance between any two adjacent positions also needs to take into account the natural line of sight movement trajectory of the user to avoid unnatural line of sight movement of the user.

S23: the wearable device performs eye tracking calibration based on the corresponding relationship between the eye movement data and the data of the preset marker.

In some embodiments, since the eye movement data and the data of the marker are obtained when the sight line of user is focused on the preset marker on the display screen, the wearable device establishes the corresponding relationship between the eye movement data and the data of the preset marker.

In some embodiments, the eye movement data includes eye movement data obtained by at least one sensor. For example, as shown in Table 1 below, the eye movement data (taking the coordinates of an orientation of the eyeball as an example) obtained by each sensor corresponds to the data of the preset marker (taking coordinates of the marker as an example).

TABLE 1

| Sensor 10 | Sensor 20 | . . . | Data of the preset marker |
|-----------|-----------|-------|---------------------------|
| (X1, Y1)  | (P1, Q1)  | . . . | (M1, N1)                  |
| (X2, Y2)  | (P2, Q2)  | . . . | (M2, N2)                  |
| . . .     | . . .     | . . . | . . .                     |
| (Xn, Yn)  | (Pn, Qn)  | . . . | (Mn, Nn)                  |

In some embodiments of the present application, after determining the corresponding relationship between the eye movement data and the data of the preset marker, the wearable device verifies an integrity of the corresponding relationship according to a preset test point and a preset verification strategy.

In some embodiments, the preset test point may be a fixation point at a preset known position. The preset verification strategy is used to verify an error between the fixation point and a fixation point detected by the wearable device. If the error is within a preset error range, the corresponding relationship between the eye movement data and the data of the preset marker is determined to be more accurate. Among them, the preset error range can be customized.

In the process of verifying the integrity of the corresponding relationship, the wearable device directs the user to focus sight line on a preset test point and obtain the eye movement data of the user and match the data of the preset marker according to the eye movement data and the corresponding relationship. The wearable device calculates an error between a point of an end of the sight line of the user and a point detected by the wearable device by comparing the matched data of the marker with data of the test point of the preset test point focused by the user. After all preset test points are tested, if the errors are within a preset error range, the wearable device determines that the corresponding relationship between the eye movement data and the data of the preset marker is relatively accurate and complete. If the errors corresponding to some preset test points are not within the preset error range, or the data of the marker corresponding to the eye movement data is not matched, the wearable device takes measures to improve the integrity of the correspondence, such as directing the user to recalibrate.

In other embodiments, after the wearable device determines the corresponding relationship between the eye movement data and the data of the preset marker, the eye movement data and the data of the marker may be encoded into data that may be used by the wearable device.

In other embodiments, after performing the eye tracking calibration, the wearable device stores the corresponding relationship between the eye movement data and the data of the preset marker in the preset memory, and deletes the original corresponding relationship stored in the preset memory.

In other embodiments, the wearable device achieves human-computer interaction based on the corresponding relationship between the data of the preset marker and the eye movement data.

In other embodiments, the wearable device displays a progress of performing the eye tracking calibration through the display screen. Among them, a way to display the progress may be customized. For example, the progress may be displayed by a progress bar, a percentage or other means. The embodiment of the present application does not limit the way of displaying the progress.

In other embodiments, the wearable device may set a prompt for a result of the eye tracking calibration, such as a prompt for successful calibration or failed calibration. Among them, the way to direct the calibration result can be a text prompt or a voice prompt, and the embodiment of the present application does not limit the way of directing the result.

In some embodiments, if the wearable device fails to calibrate the eye tracking, the wearable device enters an error handling process or provides other help options, such as directing the user to recalibrate, or providing the user with online help documents, video tutorials, real-time chat support, etc.

The method for calibrating of eye tracking provided in an embodiment of the present application, the eye tracking calibration is achieved by displaying a preset marker that moves according to a preset movement trajectory on a display screen and directing the user to focus sight line on the preset marker on the display screen. During the calibration process, a corresponding relationship between the eye movement data of the user and the data of the preset marker is established, and the eye tracking calibration is performed based on the corresponding relationship between the eye movement data and the data of the preset marker. If a pair of smart glasses is worn in a skewed way or is worn out due to long-term use, collision, or other factors, automatic calibration of eye tracking can be achieved by using the method, which improves the accuracy of eye tracking.

It should be understood that a sequence number of each step in the above embodiment does not mean an execution order. The execution order of each step should be determined by its function and internal logic, and should not constitute any limitation on the implementation process of the embodiment of the present application.

Figure 7:
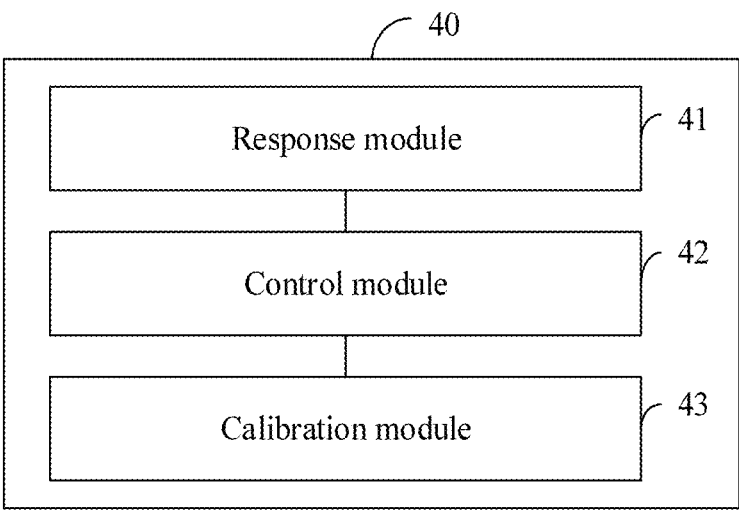
FIG. 7 is a schematic diagram of functional modules of an apparatus for calibrating of eye tracking provided in an embodiment of the present application.

Please refer to FIG. 7, which is a functional module diagram of an apparatus for calibrating of eye tracking provided in an embodiment of the present application. An apparatus 40 for calibrating of eye tracking shown in FIG. 7 implements details of the method for calibrating of eye tracking in the above embodiment and achieve the same effect. As shown in FIG. 7, the apparatus 40 for calibrating of eye tracking is applied to a wearable device with a data processing function. The apparatus 40 for calibrating of eye tracking includes: a response module 41, which is used to direct the user to focus sight line on the preset marker of the display screen in response to a calibration instruction; a control module 42, which is used to control the preset marker to move along the preset moving trajectory and obtains the eye movement data of the user and the data of the preset marker in response that the sight line of the user is detected to be focused on the preset marker; and a calibration module 43, which is used to perform eye tracking calibration based on the corresponding relationship between the eye movement data and the data of the preset marker.

The specific definition of the apparatus 40 for calibrating of eye tracking refers to the definition of the method for calibrating of eye tracking in the above text, which will not be repeated here. The various modules in the above apparatus 40 for calibrating of eye tracking may be implemented in whole or in part by software, hardware and their combination. The above modules may be embedded in or independent of the processor in the wearable device in the form of hardware or may be stored in the memory of the wearable device in the form of software, so that the processor may invoke and execute the operations corresponding to the above modules.

Figure 8:
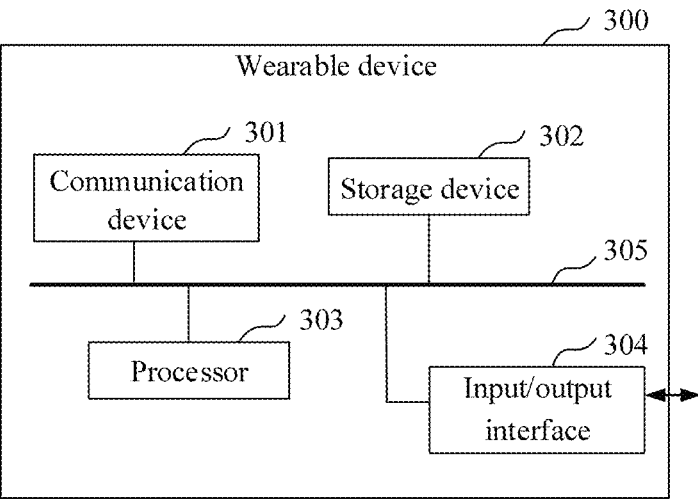
FIG. 8 is a structural diagram of a wearable device provided in an embodiment of the present application.

Please refer to FIG. 8, which is a schematic structural diagram of a wearable device 300 provided by an embodiment of the present application. The wearable device 300 includes but is not limited to a pair of smart glasses, such as a pair of VR glasses, a pair of AR glasses, etc. A network where the wearable device 300 is located includes but is not limited to the Internet, a wide area network, a metropolitan area network, a local area network, a virtual private network (VPN), etc.

As shown in FIG. 8, the wearable device 300 includes a communication device 301, a storage device 302, a processor 303, an input/output (I/O) interface 304 and a bus 305. The processor 303 is coupled to the communication device 301, the storage device 302, and the input/output interface 304 through the bus 305, respectively.

The communication device 301 may be a wireless communication device or a mobile communication device. The wireless communication device may provide wireless communication solutions applied to the wearable device 300 including a wireless local area networks (WLAN) (for example, wireless fidelity (Wi-Fi) network), a Bluetooth (BT), and a global navigation satellite system (GNSS), a frequency modulation (FM), a near field communication (NFC), an Infrared (IR) and other wireless communication solutions. The mobile communication device can provide wireless communication solutions including 2G/3G/4G/5G applied to the wearable device 300.

The storage device 302 may include one or more random access memories (RAM) and one or more non-volatile memories (NVM). The random access memory can be directly read and written by the processor 303, can be used to store executable programs (such as machine instructions) of the operating system or other running programs, and can also be used to store user data and application data, etc. The random access memory can include a static random-access memory (SRAM), a dynamic random-access memory (DRAM), a synchronous dynamic random-access memory (SDRAM), a double data Rate Synchronous Dynamic Random-access memory (DDR SDRAM, for example, the fifth generation DDR SDRAM is generally called DDR5 SDRAM), etc.

The non-volatile memory can also store executable programs and user data and application data, etc., and can be loaded into the random access memory in advance for direct reading and writing by the processor 303. The non-volatile memory can include a disk storage device and a flash memory.

The storage device 302 is used to store one or more computer programs. The one or more computer programs are configured for execution by processor 303. The one or more computer programs include a plurality of instructions. When the plurality of instructions is executed by the processor 303, the method for calibrating of eye tracking executed on the wearable device 300 can be implemented.

In other embodiments, the wearable device 300 further includes an interface for connecting to an external storage device to expand a storage capacity of the wearable device 300.

The processor 303 may include one or more processing units. For example, the processor 303 may include an application processor (AP), a modem processor, a graphics processing unit (GPU), and an image signal processor (ISP), a controller, a video codec, a digital signal processor (DSP), a baseband processor, and/or neural-network processing unit (NPU), etc. Among them, different processing units can be independent devices or the different processing units can be integrated in one or more processors.

The processor 303 provides a computing capability and a control capability. For example, the processor 303 is used to execute a computer program stored in the storage device 302 to implement the method for calibrating of eye tracking.

The I/O interface 304 is used to provide a channel for user input or output. For example, the I/O interface 304 can be used to connect various input and output devices, such as a mouse, a keyboard, a touch device, a display screen, etc., so that the user can input information, or make the information be visualized.

The bus 305 is at least used to provide a channel for a mutual communication among the communication device 301, the storage device 302, the processor 303, and the I/O interface 304 in the wearable device 300.

It can be understood that the structure illustrated in the embodiment of the present application does not constitute a specific limitation on the wearable device 300. In other embodiments of the present application, the wearable device 300 may include more or fewer components than shown in the figure, or some components may be combined, some components may be separated, or some components may be arranged differently. The components illustrated may be implemented in hardware, software, or a combination of software and hardware.

Embodiments of the present application also provide a computer-readable storage medium. A computer program is stored on the computer-readable storage medium. The computer program includes program instructions. The method implemented when the program instructions are executed may refer to the vehicle parking method or the vehicle finding method in each of the above embodiments.

The computer-readable storage medium may be an internal storage device of the computer device described in the above embodiment, such as a hard disk or a memory of the computer device. The computer-readable storage medium may also be an external storage device of the computer device, such as a plug-in hard disk, a smart memory card (SMC), or a secure digital (SD) card, a flash card equipped on the computer device.

Further, the computer-readable storage medium may mainly include a storage program area and a storage data area, among them, the storage program area may store an operating system, an application program required for at least one function, etc.; the storage data area may store data created according to a use of the computer device.

Finally, it should be noted that the above embodiments are only used to illustrate the technical solutions of the present application and are not limiting. Although the present application has been described in detail with reference to the preferred embodiments, those of ordinary skill in the art should understand that the technical solutions of the present application can be modified. Modifications or equivalent substitutions may be made without departing from the spirit and scope of the technical solution of the present application.

What is claimed is:

1. A method for calibrating of eye tracking, applied to a wearable device, the method comprising:

directing a user to focus sight line on a preset marker of a display screen in response to a calibration instruction;

controlling the preset marker to move along a preset moving trajectory and obtaining eye movement data of the user and data of the preset marker in response that the sight line of the user is detected to be focused on the preset marker, wherein the data of the preset marker comprises position data of the preset marker, obtaining the data of the preset marker comprises: establishing a regional coordinate system according to a display area of the preset marker on the display screen; obtaining a relative position of the preset marker on the display area, and determining coordinates of the preset marker according to the relative position of the preset marker on the display area and the regional coordinate system; and determining the position data of the preset marker according to the coordinates; and performing an eye tracking calibration based on a corresponding relationship between the eye movement data and the data of the preset marker.

2. The method according to claim 1, wherein the eye movement data comprises location data of an eyeball of the user, the obtaining eye movement data of the user comprises:

obtaining an image of the eyeball when a location of the eyeball is corresponding to the location data;

determining a relative position of the eyeball of the user in the image using a feature extraction algorithm and calculating coordinates of the eyeball according to the relative position; and determining the location data of the eyeball according to the coordinates.

3. The method according to claim 1, further comprising:

determining a period of time the preset marker staying at any position in response that the preset marker moves along the preset moving trajectory based on reaction time of the eyeball of the user.

4. The method according to claim 1, further comprising:

determining a spatial distance between any two adjacent positions when the preset marker moves along the preset moving trajectory based on an interface resolution of the display screen.

5. The method according to claim 1, further comprising:

verifying an integrity of the corresponding relationship according to a preset test point and a preset verification strategy.

6. The method according to claim 1, further comprising:

directing the user to focus sight line on the preset marker by a predetermined manner, the predetermined manner comprises at least one or more of text prompt information, voice prompt information, and flashing of the preset marker.

7. A wearable device comprising:

a storage device;

at least one processor; and the storage device storing one or more programs that, when executed by the at least one processor, cause the at least one processor to:

direct a user to focus sight line on a preset marker of a display screen in response to a calibration instruction;

control the preset marker to move along a preset moving trajectory and obtain eye movement data of the user and data of the preset marker in response that the sight line of the user is detected to be focused on the preset marker, wherein the data of the preset marker comprises position data of the preset marker, the at least one processor further caused to: establish a regional coordinate system according to a display area of the preset marker on the display screen; obtain a relative position of the preset marker on the display area, and determine coordinates of the preset marker according to the relative position of the preset marker on the display area and the regional coordinate system; and determine the position data of the preset marker according to the coordinates; and perform an eye tracking calibration based on a corresponding relationship between the eye movement data and the data of the preset marker.

8. The wearable device according to claim 7, wherein the eye movement data comprises location data of an eyeball of the user, the at least one processor obtains the eye movement data of the user by:

obtaining an image of the eyeball when a location of the eyeball is corresponding to the location data;

determining a relative position of the eyeball of the user in the image using a feature extraction algorithm and calculate coordinates of the eyeball according to the relative position; and determining the location data of the eyeball according to the coordinates.

9. The wearable device according to claim 7, wherein the at least one processor is further caused to:

determine a period of time the preset marker staying at any position in response that the preset marker moves along the preset moving trajectory based on reaction time of the eyeball of the user.

10. The wearable device according to claim 7, wherein the at least one processor is further caused to:

determine a spatial distance between any two adjacent positions when the preset marker moves along the preset moving trajectory based on an interface resolution of the display screen.

11. The wearable device according to claim 7, wherein the at least one processor is further caused to:

verify an integrity of the corresponding relationship according to a preset test point and a preset verification strategy.

12. The wearable device according to claim 7, wherein the at least one processor is further caused to:

direct the user to focus sight line on the preset marker by a predetermined manner, the predetermined manner comprises at least one or more of text prompt information, voice prompt information, and flashing of the preset marker.

13. A non-transitory storage medium having instructions stored thereon, when the instructions are executed by a processor of a wearable device, the processor is caused to perform a method for calibrating of eye tracking, wherein the method comprises:

directing a user to focus sight line on a preset marker of a display screen in response to a calibration instruction;

controlling the preset marker to move along a preset moving trajectory and obtaining eye movement data of the user and data of the preset marker in response that the sight line of the user is detected to be focused on the preset marker, wherein the data of the preset marker comprises position data of the preset marker, obtaining the data of the preset marker comprises: establishing a regional coordinate system according to a display area of the preset marker on the display screen; obtaining a relative position of the preset marker on the display area, and determining coordinates of the preset marker according to the relative position of the preset marker on the display area and the regional coordinate system; and determining the position data of the preset marker according to the coordinates;

performing an eye tracking calibration based on a corresponding relationship between the eye movement data and the data of the preset marker.

14. The non-transitory storage medium according to claim 13, wherein the eye movement data comprises location data of an eyeball of the user, the obtaining eye movement data of the user comprises:

obtaining an image of the eyeball when a location of the eyeball is corresponding to the location data;

determining a relative position of the eyeball of the user in the image using a feature extraction algorithm and calculating coordinates of the eyeball according to the relative position; and determining the location data of the eyeball according to the coordinates.

15. The non-transitory storage medium according to claim 13, wherein the method further comprises:

determining a period of time the preset marker staying at any position in response that the preset marker moves along the preset moving trajectory based on reaction time of the eyeball of the user.

16. The non-transitory storage medium according to claim 13, wherein the method further comprises:

determining a spatial distance between any two adjacent positions when the preset marker moves along the preset moving trajectory based on an interface resolution of the display screen.

17. The non-transitory storage medium according to claim 13, wherein the method further comprises:

verifying an integrity of the corresponding relationship according to a preset test point and a preset verification strategy.

* * * * *